(12) United States Patent
Shimizu et al.

(10) Patent No.: US 8,276,936 B2
(45) Date of Patent: Oct. 2, 2012

(54) AUTOMOTIVE AIRBAG APPARATUS

(75) Inventors: Yosuke Shimizu, Yokohama (JP);
Hiroyuki Taguchi, Yokohama (JP);
Naoya Fuyuki, Yokohama (JP)

(73) Assignee: Autoliv Development AB, Vargarda (SE)

( * ) Notice: Subject to any disclaimer, the term of this patent is extended or adjusted under 35 U.S.C. 154(b) by 330 days.

(21) Appl. No.: 12/578,236

(22) Filed: Oct. 13, 2009

(65) Prior Publication Data
US 2010/0102541 A1   Apr. 29, 2010

(30) Foreign Application Priority Data

Oct. 27, 2008   (JP) .................................. 2008-276189
Mar. 23, 2009   (JP) .................................. 2009-070693

(51) Int. Cl.
*B60R 21/205*   (2006.01)
*B60R 21/215*   (2006.01)

(52) U.S. Cl. .................................. 280/728.3; 732/728.2
(58) Field of Classification Search .............. 280/728.2, 280/732, 728.3
See application file for complete search history.

(56) References Cited

U.S. PATENT DOCUMENTS

| | | | |
|---|---|---|---|
| 5,452,913 A | | 9/1995 | Hansen et al. |
| 5,588,674 A | * | 12/1996 | Yoshimura et al. ............ 280/732 |
| 5,613,698 A | * | 3/1997 | Patercsak et al. ........... 280/728.1 |
| 6,474,686 B1 | * | 11/2002 | Higuchi et al. ............. 280/743.1 |
| 7,712,781 B2 | * | 5/2010 | Klinkenberger et al. .. 280/743.1 |
| 7,770,925 B2 | * | 8/2010 | Seymour et al. ............ 280/743.1 |
| 7,874,580 B2 | * | 1/2011 | Wigger et al. ................. 280/732 |
| 7,878,539 B2 | * | 2/2011 | Maripudi et al. .............. 280/740 |
| 2003/0122356 A1 | * | 7/2003 | Fischer et al. ............. 280/743.1 |
| 2003/0189319 A1 | * | 10/2003 | Soderquist ................. 280/728.3 |
| 2005/0167958 A1 | | 8/2005 | Okada et al. |
| 2007/0007757 A1 | * | 1/2007 | Bauer et al. ................ 280/743.2 |
| 2009/0091111 A1 | * | 4/2009 | Fischer et al. ............. 280/743.1 |
| 2009/0146401 A1 | * | 6/2009 | Wigger et al. ............. 280/728.3 |

FOREIGN PATENT DOCUMENTS

| | | |
|---|---|---|
| EP | 1747948 A1 | 1/2007 |
| JP | 08-108816 | 4/1996 |
| JP | 2000-247199 | 9/2000 |
| JP | 2001-030863 | 2/2001 |
| JP | 2001-334900 | 12/2001 |
| JP | 2007-022523 | 2/2007 |
| WO | 2006/003748 A1 | 1/2006 |

* cited by examiner

*Primary Examiner* — Ruth Ilan
(74) *Attorney, Agent, or Firm* — Harness, Dickey & Pierce, P.L.C.

(57) ABSTRACT

An automotive airbag apparatus is able to reduce the shock caused by early deployment of airbag against a passenger not in a position for safe airbag restraint, and further able to deploy quickly and effectively when a passenger is in a position for safe restraint. The airbag apparatus includes an airbag housing in which a folded airbag resides until deployed by the gas from an inflator, an airbag door that opens on a hinge from the pressure applied by the deploying airbag, and a restrictor member extending over the folded airbag beneath the airbag door with a direction from front to rear of the vehicle. The restrictor member has a fixed end at forward part thereof attached to the airbag housing, and a releasable fixed or free end at rearward part thereof, the free end coming into frictional contact with the airbag door in the vicinity of the hinge as the airbag door is pushed out by the early phase of the airbag deployment.

19 Claims, 15 Drawing Sheets front side of a vehicle ← → rear side of a vehicle

AUTOMOTIVE AIRBAG APPARATUS

CROSS REFERENCE TO RELATED APPLICATIONS

This application claims the benefit and priority of Japanese Patent Applications Nos. JP2008-276189, filed Oct. 27, 2008 and JP 2009-070693, filed Mar. 23, 2009. The entire disclosures of each of the above applications are incorporated herein by reference.

FIELD

The current disclosure relates to an automotive airbag apparatus specifically that controls, restrains, and/or alters the direction of initial deployment of airbag.

BACKGROUND

The statements in this section merely provide background information related to the present disclosure and may not constitute prior art.

Various methods of controlling airbag deployment are previously known.

Reference Patent Document 1 describes an airbag apparatus to be designed for easy manufacture and to provide a deployment process that is simple to control. To achieve these ends, the airbag and inflator are installed within a retainer case, and when the inflator ignites and emits the gas into the airbag as a result of the vehicle experiencing a sudden shock, a door opens from the pressure of the inflating and deploying airbag. A deployment interference part that interferes with deployment of the airbag, and a runoff part from which the interference is relieved, are provided on the external side of the airbag in order to control the deployment of the airbag. The deploying airbag escapes from the deployment interference part as deployment of the airbag progresses. In this apparatus, the deployment interference part comprises a strap whose both ends are structured as fixed parts respectively.

Reference Patent Document 2 describes an airbag apparatus that, in order to equalize contact friction generated between the airbag and the interior members when the airbag deploys, provides a structure in which a folded up airbag is installed within an airbag module located in the vehicle's instrument panel. One end of an intervenient fabric part is fixedly attached at the securing part of the airbag to the airbag module, and the other end is free and non-fixed. This structure accomplishes a smooth airbag deployment action under a constant friction at the time when the airbag door is forced open by the deploying airbag even though friction is generated by contacting the airbag with the vehicle door or windshield, since the intervenient fabric part is put there between. In this apparatus, the fixed end of the intervenient fabric part is secured in the proximity of the hinge on the airbag door.

Reference Patent Document 3 describes an airbag apparatus that uses an improved method of altering the initial deployment direction of an airbag with the purpose of reducing the pressure applied by the deploying airbag to the passenger in the vehicle. To do this, the airbag apparatus has a structure comprising an airbag, a first frictional member, and a second frictional member. This structure has a portion contacting with at least a part of the airbag, and as a result of the second frictional member being laid over the first frictional member, friction is generated between the first and second frictional members when the airbag initially deploys. Frictional contact with the first frictional member is maintained while the airbag deploys in the lateral direction (in relation to the vehicle's passengers) until the point is reached where the friction is completely overcome by the deploying airbag.

Reference Patent Document 4 describes an airbag apparatus designed to prevent an airbag that initially deploys at high speed from interfering with a vehicle passenger or child seat. In this apparatus, a folded airbag is installed within the steering wheel module cover, and the edge of the airbag opening part is fixedly attached to a retainer part that supports the inflator. A deployment restrictor sheet is provided along the internal surface of the module cover, said restrictor sheet being fixedly attached to the retainer part with one edge thereof and covering the folded airbag in a direction extending from the rear to the front of the vehicle. The restrictor sheet is formed to a length greater than an inner periphery length of the module cover in the vehicle fore-aft direction. Airbag deployment, which occurs in direction moving toward the rear of the vehicle, is controlled by the restrictor sheet in a way that prevents the airbag from immediately contacting the passenger during initial deployment. In this airbag apparatus, similar to the one described by Patent Reference Document 2, the fixed part of the deployment restrictor sheet is secured in the vicinity of the lid hinge.

[Patent Reference Document 1] Japanese unexamined patent publication No. 2001-30863

[Patent Reference Document 2] Japanese unexamined patent publication No. 08-108816

[Patent Reference Document 3] Japanese unexamined patent publication No. 2007-22523

[Patent Reference Document 4] Japanese unexamined patent publication No. 2001-334900

One of the problems associated with the deployment of an automotive airbag is to restrain the force of deployment when the vehicle occupant is not in a correct position amenable to safe restraint by the deploying airbag. The incorrect position means, for example, that the occupant head or chest is contacted with or located in the vicinity of the airbag door. In this case it is desirable for the open force of the airbag door be restrained to the extent that it will not cause injury to the vehicle occupant should it strike the head, chest, or other body part during initial airbag deployment. Conversely, to avoid injury to the vehicle occupant resulting from a collision, an airbag must apply sufficient restraining force to safely hold the occupant when that occupant is seated in a correct position amenable to safe airbag restraint. It is desirable that an airbag be able to fulfill both of these tasks.

Because the airbag apparatus described in Patent Reference Document 1 places a strap around the airbag with both ends of the strap fixed, we can expect a reduction in deployment shock to a person in the incorrect position for airbag restraint. However, we cannot deny that this structure reduces the speed of deployment, and thus makes it difficult to obtain adequate performance from the airbag in respect to a vehicle occupant in a correctly seated position.

The airbag apparatuses described in Patent Reference Documents 2 and 4, which respectively utilize the intervenient fabric part or the restrictor sheet placed between airbag and interior member or between airbag and occupant, locate the fixed edge of said fabric part or sheet in the vicinity of the hinge on the airbag door for a smooth motion thereof. Considering the deployment of the airbag with the occupant in a less than correct position, this type of structure is unable to dampen the shock of initial deployment due to the difficulty of controlling the initial opening movement of the airbag door.

While we can expect the airbag apparatus described by Patent Reference Document 3 to reduce the force applied by an airbag to a vehicle occupant by controlling the direction of initial airbag deployment, there is a possibility that the friction generated between the first and second frictional members may cause said members to tear. Moreover, while this structure may dampen the shock of an airbag deploying when the vehicle occupant is in a less than correct position, there remains a problem in that the friction prevents airbag from deploying with sufficient velocity to safely restrain a vehicle occupant in the correct seating position.

As means of mitigating the aforesaid shortcomings, the automotive airbag apparatus invention described by this application is able to dampen airbag deployment pressure as means of avoiding injury to a vehicle occupant who has assumed a less than correct position in relation to the airbag, but is also able to deploy with sufficient velocity to safely restrain a vehicle occupant in a correctly seated position.

SUMMARY

The automotive airbag apparatus invention comprises an airbag folded within an airbag housing and deployed by gas injected therein from an inflator; an airbag door attached to the airbag housing through a hinge with rotationally movable state and opened by pressure applied from deploying force of the airbag; and a restrictor member being faced to the airbag door and wrapped over the folded airbag with a direction from front to rear of the vehicle, the restrictor member having a forwardly located fixed end attached to the airbag housing and a rearwardly located free end, the free end making frictional contact against the airbag door in a region proximal to the hinge when the airbag door opens by the pressure applied thereto at a start of the airbag deployment.

The width of the restrictor member may preferably be established to a dimension narrower than that of the airbag door in the width direction of the vehicle.

The fixed end and free end of the restrictor member may preferably be set locations where the restrictor member covers both one point being the forward lower part of the folded airbag and another point being the rearward upper part of the airbag.

The free end of the restrictor member may be attached to the airbag housing through a break-away part capable of releasing the free end from pressure applied thereto by the deploying airbag.

A friction amplification part may be provided at the free end of the restrictor member as means of amplifying friction generated against the airbag door.

A friction augmentation part may be provided on the airbag door as means of augmenting friction against the free end of the restrictor member.

The restrictor member may also be utilized as a packing part to maintain the folded condition of the airbag within the airbag housing.

The packing part that maintains the airbag in a folded condition within the airbag housing may overlap the restrictor member and be attached to the airbag housing through a tear-away part able to release from the airbag housing in response to the pressure applied by the airbag deployment.

The tear-away part may be attached to an internal rearward portion of the airbag housing relative to the fore-aft axis of the vehicle.

Moreover, the automotive airbag apparatus invention described in this application is installed within a vehicle instrument panel behind an airbag door, the apparatus equipped with a restrictor member located behind the airbag door, the restrictor member having a fixed end at the vehicle forward side of the restrictor member and a releasable fixed end or free end at the vehicle rearward side of the restrictor member, the restrictor member wrapping around the airbag from the front side to the rear side of the airbag, and the rearward part of the restrictor member overlapping the airbag door so as to restrict and control the deployment direction in early phase of airbag deployment.

The restrictor member may be of a strap or sash-like configuration as oriented with a direction from front to rear of the vehicle.

The automotive airbag apparatus invention described by this application is able to dampen airbag deployment pressure as means of avoiding injury to a vehicle occupant who has assumed a less than correct position in relation to the airbag, but is also able to deploy with sufficient velocity to safely restrain a vehicle occupant in a correctly seated position.

DETAILED DESCRIPTION

Figure 1:
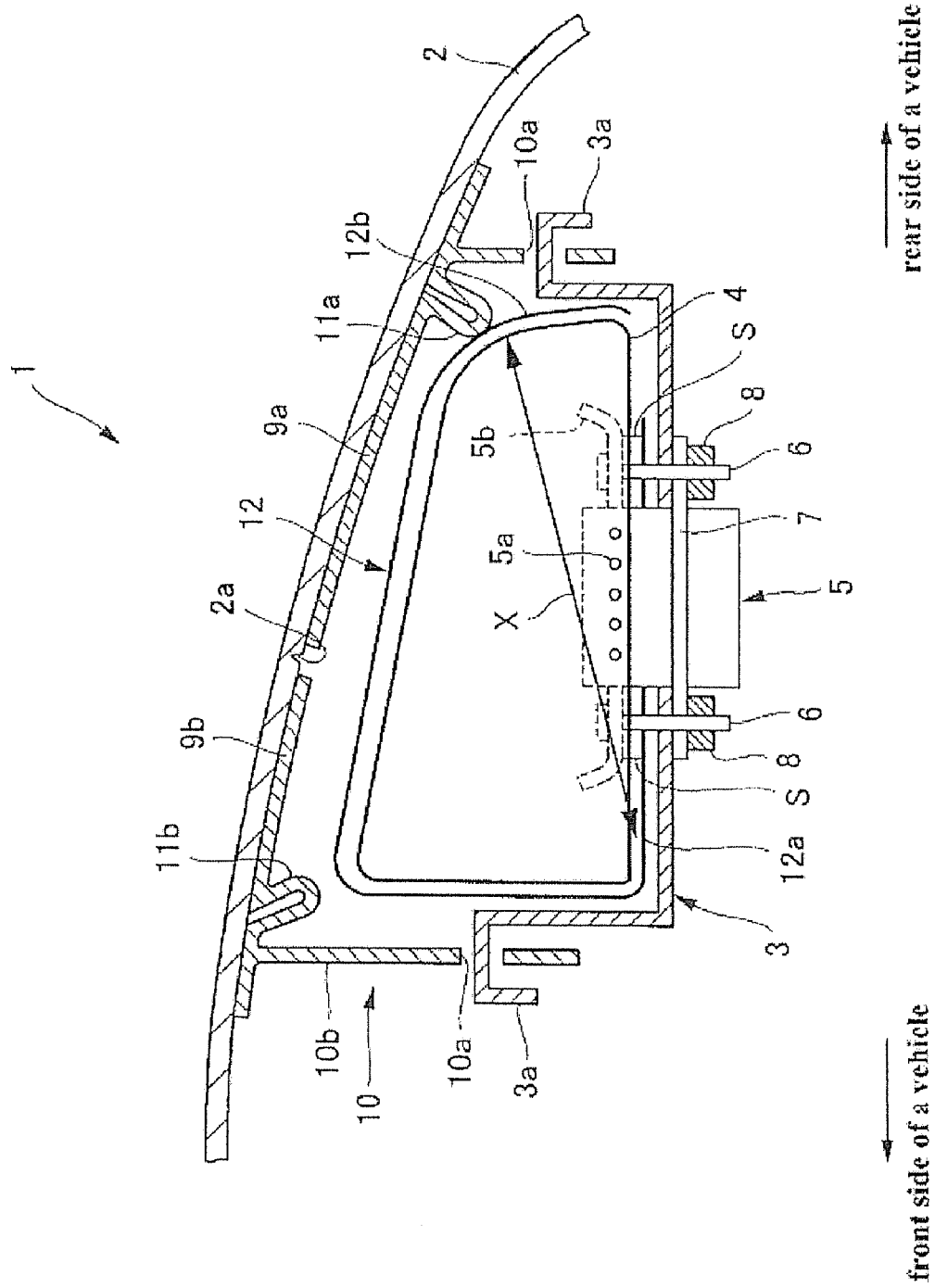
FIG. 1 is a cross sectional view of a preferred embodiment of the vehicular airbag invention.
Figure 2:
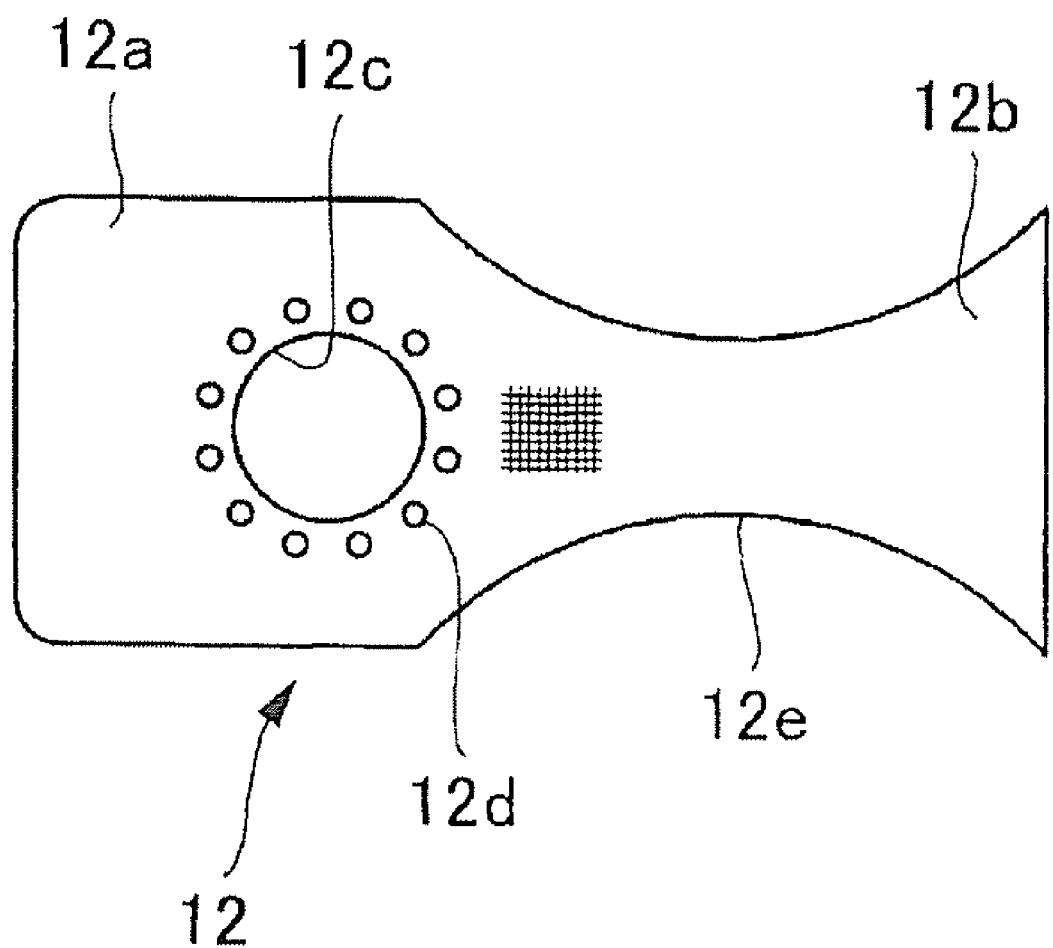
FIG. 2 is an overhead view of a preferred embodiment of the restrictor member part according to FIG. 1.
Figure 3:
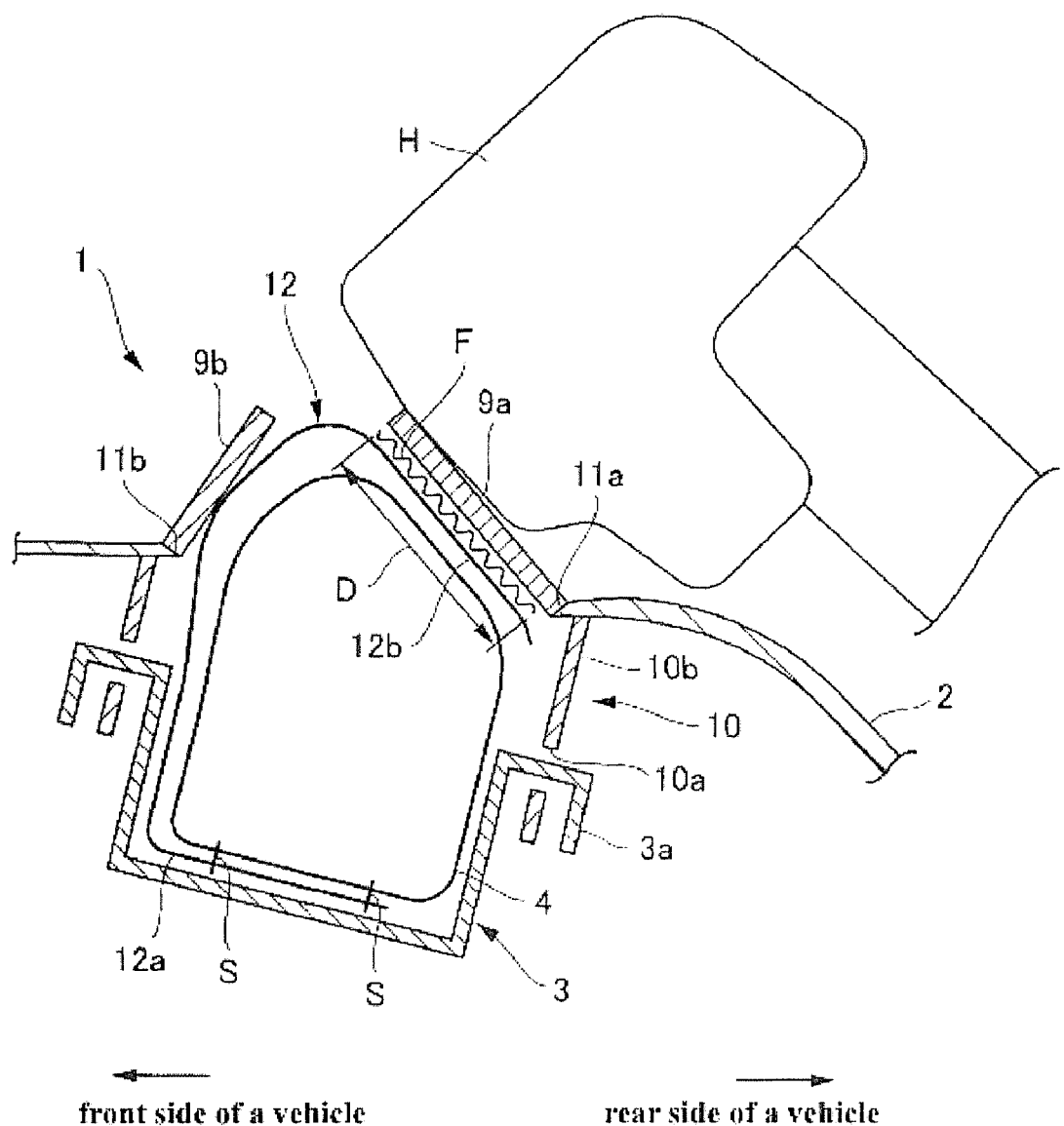
FIG. 3 is a line drawing describing the operation of the airbag invention shown in FIG. 1.
Figure 4:
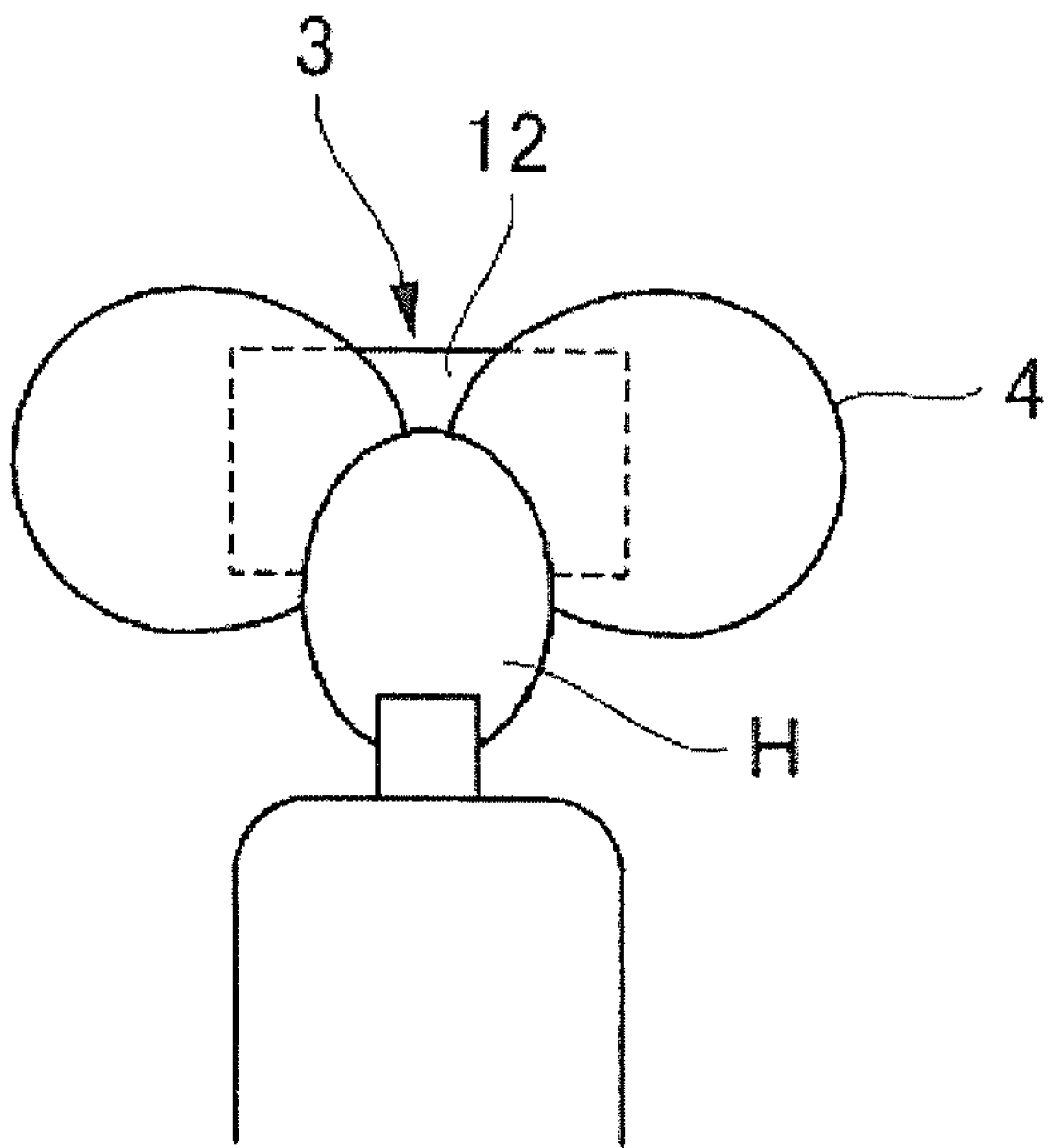
FIG. 4 is a line drawing describing the operation of the airbag invention viewed from behind a passenger in the vehicle, according to FIG. 1.
Figure 5:
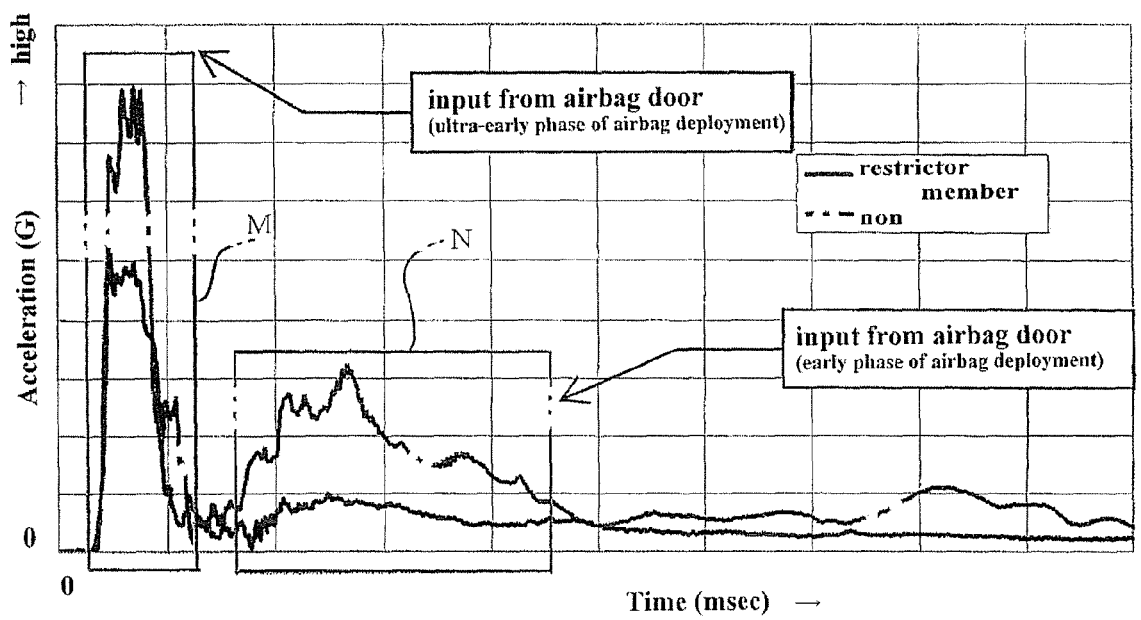
FIG. 5 is a line graph showing data reflecting the extent of pressure applied to the head as a result of the operation of the airbag invention.
Figure 6:
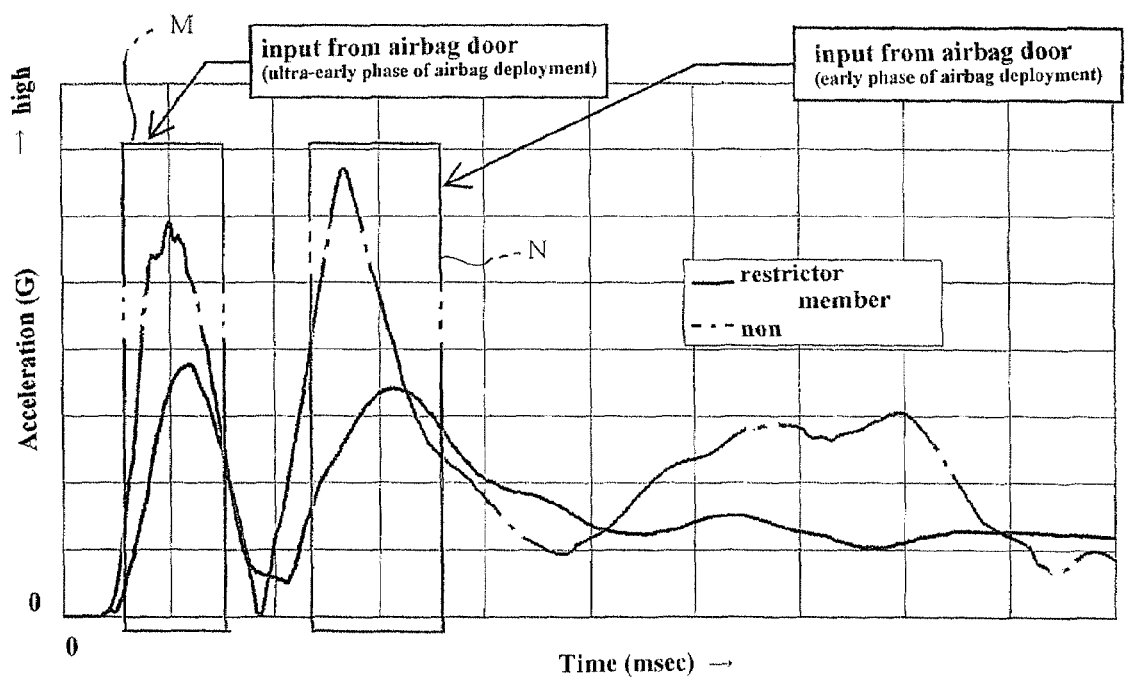
FIG. 6 is a line graph showing data reflecting the extent of pressure applied to the neck as a result of the operation of the invention.

The following will describe preferable embodiments of the automotive airbag apparatus invention with reference to the attached drawings. FIG. 1 is a cross sectional view of the automotive airbag apparatus invention, FIG. 2 is a plan view of one example of the restrictor member used in the FIG. 1 apparatus, FIG. 3 is an illustrative diagram showing the operation of the FIG. 1 apparatus, and FIG. 4 is an illustrative drawing showing the configuration of the airbag deployed by the FIG. 1 apparatus viewed from directly behind the vehicle occupant. FIG. 5 is a line graph showing the acceleration forces of airbag deployment in regard to injury to a human head, and FIG. 6 is the same type of line graph showing injurious forces applied to a human neck.

FIG. 1 describes an embodiment of the invention as automotive airbag unit 1 installed to the passenger side of a vehicle. As shown in FIG. 1, instrument panel 2 is provided on the passenger side of the vehicle, the front part of the panel facing the vehicle's windshield, and the rear facing the passenger seat.

Airbag housing 3 is an upwardly openable box-like structure installed at and faced to the underside of the instrument panel 2. An airbag 4 is installed in a folded up condition within the airbag housing 3.

An inflator 5 is installed to the lower internal surface of the airbag housing 3. The inflator 5 includes gas discharge ports 5a and retainer 5b, the latter serving as means of fixedly attaching the inflator 5 to the airbag housing 3 through the threaded studs 6.

Inflator insertion hole and bolt insertion holes are formed in the lower surface of the airbag housing 3 and the airbag 4 as means of allowing the insertion of the inflator 5 and threaded studs 6 therethrough. The gas discharge ports 5a and the retainer 5b incorporating the threaded studs 6 are located in the internal region of the airbag 4. The lower part of the inflator 5 and the threaded studs 6 protrude outwardly from the airbag 4 and penetrate the bottom part of the airbag housing 3.

A ring-shaped plate 7, through which the threaded studs 6 pass, surrounds the lower part of the inflator 5 and is attached to the lower external surface of the airbag housing 3. The inflator 5 and airbag 4 are secured to the airbag housing 3 through a structure in which the airbag 4 and airbag housing 3 are sandwiched between the plate 7 and retainer 5b through nuts 8 tightened over threaded studs 6.

Airbag 4 is deployed by the discharge of an inflation gas emitted from the gas discharge ports 5a in the inflator 5.

A door structure 10, having airbag door 9a and 9b formed as integral parts thereof, is attached to the underside of the instrument panel 2. The airbag housing 3 is attached to the instrument panel 2 through hanger pieces 3a of the airbag housing 3 inserted into hanger slots 10a formed in the door structure 10.

In addition to hanger slots 10a, the door structure 10 includes a cover panel 10b having an integral upper flange part attached to the underside of the instrument panel 2; hinges 11a and 11b formed integral to the cover panel 10b, the former located toward the rear side of the instrument panel 2, and the latter toward the front side; and airbag doors 9a and 9b integrally and rotatably formed to and extending from the cover panel 10b such as a hinged double doors, through the hinges 11a and 11b respectively.

The airbag doors 9a and 9b are attached to the underside of the instrument panel 2. Due to the airbag housing 3 being attached to the door structure 10, airbag doors 9a and 9b are able to rotationally swing on hinges 11a and 11b respectively in relation to the airbag housing 3.

Separation groove 2a is formed on the underside of the instrument panel 2 between the opposing edges of the airbag doors 9a and 9b. The separation of the instrument panel 2 at the separation groove 2a allows the instrument panel 2 to be pushed open along with the opening of airbag doors 9a and 9b.

The forwardly located airbag door 9b is able to swing upward on its hinge 11b in a direction toward the front of the vehicle, that is, toward the windshield. The rearwardly located airbag door 9a is able to swing upward on its hinge 11a in a direction toward the rear of the vehicle, that is, toward the front passenger seat. The airbag doors 9a and 9b swing open through the force applied thereto by the deployment of the airbag 4 from the airbag housing 3.

As shown in FIGS. 1 and 2, this embodiment includes a sash or strap-shaped sheet restrictor member 12 that, in order to ensure an operating space of deployment and to prevent the deployment of the airbag 4 from excessively restricting, is formed to a width narrower than the airbag doors 9a and 9b, or narrower than the width of the airbag 4, in the direction of the width of the vehicle.

The restrictor member 12 lays over the top surface of the folded up airbag 4 beneath the airbag doors 9a and 9b in a lengthwise direction extending from the front of the vehicle toward the rear. The lengthwise ends of the restrictor member 12 comprise a fixed end 12a (the left end of the restrictor member 12 shown in FIG. 2) and a free end 12b (the right end shown in FIG. 2).

In a structure similar to that described in relation to the airbag 4, an inflator insertion hole 12c and bolt holes 12d are provided in the fixed end 12a of the restrictor member 12 in order to allow the inflator 5 and threaded studs 6 to pass there through. The fixed end 12a becomes part of the airbag 4 from its attachment thereto by means of a sewn joint 's' or other connective method. The fixed end 12a is attached to the airbag housing 3, together with the airbag 4 and inflator 5, through the insertion of the inflator 5 into the inflator insertion hole 12c and the insertion and securing of the threaded studs 6 to the bolt holes 12d.

Restriction limiter part 12e, which is an integrally formed narrow section of the restrictor member 12 located at the approximate midpoint between the fixed end 12a and the free end 12b, provides an operating space that acts to prevent excessive restriction of the deploying airbag 4. The fixed end 12a is set as a forward fixing point by means of surrounding and being attached to the forward lower part of the airbag 4.

The free end 12b of the restrictor member 12 is set as a rearward removing point by means of extending over the top of the airbag 4 in the rearward direction past the hinge 11a so as to overlap the airbag door 9a. Extending the free end 12b on the airbag 4 in the rearward direction along the airbag door 9a and beyond the hinge 11a allows frictional force 'F' to be generated between the free end 12b and the region around the hinge 11a during initial deployment when the airbag 4 applies pressure upwardly to the airbag door 9a (see FIG. 3).

At least, the free end 12b of the restrictor member 12 is made from fabric or other woven material capable of generating friction when it slides against airbag door 9a or hinge 11a made from synthetic resins or other material. As indicated by the arrow 'X' in FIG. 1, the restrictor member 12 wraps around the folded airbag 4 with the fixed end 12a located at the forward lower portion and the free end 12b at the upper rearward portion in respect to the vehicle fore-aft axis.

The length of the restrictor member 12 is established so as to envelope the airbag 4 from its front to its rear part, and in order to control the movement of the airbag 4 at initial deployment, each end 12a and 12b of the restrictor member 12 extends beyond these two parts with the free end 12b extending to a point beyond the vicinity of the hinge 11a.

In plan view, the restrictor member 12 may be formed in a curved or straight configuration as long as its function is not adversely affected. The length of the restrictor member 12 is determined through consideration of injury values and the height of the stored airbag 4.

The fixed end 12a may be attached to the retainer 5b and/or airbag housing 3 in the previously described manner, or it may be formed integral to the airbag 4. Either method may be used providing that the operation of the restrictor member 12 and overall performance of the airbag 4 are not adversely affected.

Free end 12b may be releasably attached to the airbag housing 3 and/or retainer 5b through releasable slit parts.

The free end 12b may be structured to extend along the airbag door 9a in any configuration advantageous to overlap the airbag door 9a with following the deployment of the airbag 4.

To summarize, the restrictor member 12, which resides in the area internal to the airbag doors 9a and 9b, restricts the direction of initial deployment of the airbag 4 through a structure in which the fixed end 12a is attached to the front part of the airbag 4, and the free end 12b is unattached or releasably attached at the rear part of the airbag 4 (in respect to the fore-aft axis of the vehicle) thereby strapping the airbag 4. This directional control for airbag 4 is accomplished by the free end 12b which is in a free or releasably attached condition relative to the airbag 4 and slides against the inner surface of the airbag door 9a during initial airbag deployment which includes an ultra-early phase and a following early phase of airbag deployment.

That is to say, the restrictor member 12, which wraps around the airbag 4 in the fore-aft direction relative to the vehicle, is able to perform its intended function whether formed as a straight or curved member. The length of the restrictor member 12, which will vary according the design of the vehicle, may extend from 50 mm to 500 mm. Moreover, the width of the restrictor member 12 may vary according to the design of the vehicle in which it is installed. The restrictor member 12 may be constructed from fabric or other material of equal or greater in strength, and/or of multiple layers of the fabric according to the vehicle and application.

The following will explain operation of the automotive airbag unit 1 in situations in which a person is both correctly and incorrectly seated in the vehicle, the later being a case, for example, when the occupant's head 'H' or chest in proximity to or in contact with the airbag door 9a or 9b.

If the vehicle occupant is incorrectly seated and the airbag 4 deploys, the airbag 4 initially presses against airbag doors 9a and 9b resulting in the front airbag door 9b swinging open toward the front of the vehicle, and the rear airbag door 9a opening toward the rear of the vehicle and coming into contact with the occupant's head 'H' as shown in FIG. 3. This explains within the ultra-early phase 'M' of deployment time of the airbag 4 shown in milliseconds in the line graphs in FIGS. 5 and 6.

When the rear airbag door 9a comes into contact with the occupant's head 'H', the restrictor member 12 located on the airbag 4 and opposite to the internal surface of the airbag door 9a, is pressed by the deploying airbag 4 toward airbag door 9a whose movement is restricted by the occupant's head 'H', therefore contacting with the airbag door 9a.

This operation results in the rear airbag door 9a being intermittently pushed in the opening direction by the deploying airbag 4 while the free end 12b of the restrictor member 12 (whose fixed end 12a is connected to the airbag 4) is drawn toward the front of the vehicle by the deploying airbag 4. This results in the generation of friction 'F' between the free end 12b and the internal surface of the rear airbag door 9a along distance 'D'.

This friction controls that the restrictor member 12 is slipped out of the space between airbag 4 and airbag door 9a, and prevents the immediate opening of airbag door 9a and immediate deployment of the center portion of the airbag 4, thus weakening the force of deployment of the airbag 4 toward the passenger seat. As a result of the tension generated at the part of the restrictor member 12 between its fixed end 12a and free end 12b, the deployment of the airbag 4 is directed to the horizontal axis, that is, toward the sides of the vehicle, as shown in FIG. 4.

Forming the restrictor member 12 to a narrow width propagates smooth deployment of the airbag 4 in a transverse direction relative to the fore-aft axis of the vehicle. Compared to an airbag apparatus not equipped with the restrictor member 12, this structure is able to dampen the force applied by the airbag 4 to the vehicle occupant during the ultra-early phase deployment (as shown by the 'M' range in the graphs of FIGS. 5 and 6) by propagating airbag deployment in transverse directions away from the vehicle occupant.

When the early phase 'N' of airbag deployment time being 10 milliseconds as shown in the graphs in FIGS. 5 and 6 after the ultra-early phase deployment of the airbag 4, the airbag 4 continues to deploy as the free end 12b of the restrictor member 12 separates from the airbag door 9a and airbag 4, thus ending the restrictive effect of the restrictor member 12 and allowing the airbag 4 to continue deploying in a normal fashion toward the passenger seat of the vehicle, with opening the airbag door 9a.

As shown by range 'N' in the FIGS. 5 and 6 graphs, the airbag apparatus invention differs from an airbag apparatus not equipped with the restrictor member 12 by being able to significantly reduce the shock that an deploying airbag 4 applies to a vehicle occupant while still restraining and protecting the occupant from injury.

To reiterate, due to the airbag door 9a overlapping the free end 12 of the restrictor member 12, the restrictor member 12 becomes caught between the airbag door 9a and airbag 4 at a time of the ultra-early phase of airbag deployment, thus causing the deploying airbag 4 to initially expand in lateral directions (in relation to the vehicle's fore-aft axis) away from the occupant after which the airbag 4 fully deploys directly rearward toward the occupant. This type of controlled directional deployment prevents excessive pressure being applied to the vehicle occupant when he/she should incorrectly be in proximity to or contact with the airbag door at the time of initial deployment.

When the vehicle passenger is correctly seated, the passenger's head 'H' does not come into contact with the rear airbag door 9a when the airbag 4 is deployed. In this case, the free end 12b of the restrictor member 12 is pulled out in the forward direction (in relation to the vehicle's fore-aft axis) by the deployment of airbag 4, thus allowing the airbag door 9a to open without interference and the airbag 4 to deploy immediately. Moreover, as the airbag door 9a is able to open immediately with an unencumbered movement no different than that of an airbag unit not equipped with the restrictor member 12, the airbag 4 is thus able to deploy quickly and adequately restrain and protect the vehicle occupant in the event of a collision.

As previously noted, the airbag apparatus invention, embodied here in the form of the airbag unit 1, incorporates a restrictor member 12 that extends over the folded airbag 4 in a rearward direction opposing the internal surface of the airbag door 9a. The restrictor member 12 includes a fixed end 12a attached to the front of the airbag housing 3, and a free end 12b located on the rear side of the vehicle and able to generate friction in the vicinity of the hinge 11a of the airbag door 9a during initial deployment of the airbag 4. Therefore, the automotive airbag unit 1 is able to dampen the shock of deployment applied to a vehicle passenger when that passenger is not correctly seated, and is also able to deploy quickly to adequately protect a vehicle passenger who is correctly seated in respect to airbag restraint.

Moreover, in order to reduce the shock at a time of the ultra-early phase deployment to a passenger's head 'H' or other body part when that passenger is not correctly positioned for airbag restraint, the restrictor member 12 operates in a manner that reduces that shock by controlling the deployment direction of the airbag 4.

Although various structures have been construed to prevent the airbag 4 from causing injury to the vehicle occupant, few measures have been taken to prevent the airbag door 9a from injuring the occupant. While various structures have been applied to the airbag 4 to help prevent injury, it has proven difficult to prevent the airbag door 9a from injuring the occupant. The restrictor member 12 proposed by this invention functions as means of preventing this injury on airbag door 9a.

A major reason for the use of the restrictor member 12 is to separate the injury causing potential of the airbag door 9a and airbag 4, and thus reduce the potential for head injury to the vehicle passenger.

While functioning in a way that reduces the danger of airbag door 9a induced injury to an incorrectly seated passenger, the free end 12b has very little effect on the ordinary airbag's ability to deploy quickly to restrain the passenger. The restrictor member 12 reduces the potential for injury in cases where the passenger's head 'H' or chest is in a position directly over the airbag door 9a.

Therefore, due to the restrictor member 12 being located directly under the airbag door 9a, when the airbag 4 begins to deploy in a situation where the vehicle passenger's head is in proximity to the airbag door 9a, the restrictor member 12 laps against the underside of the airbag door 9a, thereby initially limiting airbag early deployment to the transverse direction away from the passenger while simultaneously suppressing the force applied by the airbag 4 to the airbag door 9a, and thus reducing the potential of the airbag door to cause injury to the passenger's head.

The deployment of the airbag 4 is not excessively restricted as sufficient space is provided for immediate deployment by establishing the width of the restrictor member 12 less than that of the airbag door 9a.

Because the fixed end 12 and free end 12b of the restrictor member 12 are located at lower front part and upper rear part of the airbag 4 respectively (forward and rear being in respect to the fore-aft axis of the vehicle), the restrictor member 12 encompasses the airbag 4 from the front to the rear, and is thus able to restrictively control the airbag's deployment direction during initial deployment.

By locating the restrictor member 12 beneath the internal surface of the airbag door 9a, even if the airbag 4 deploys with a vehicle occupant not correctly seated (e.g., a child standing in proximity to the airbag door 9a), the shock applied by the airbag 4 to the person's head is reduced, but there is no adverse effect on the ability of the airbag 4 to quickly deploy and safely restrain a person.

In order to establish the desired force with which the airbag 4 may strike the head of a person who is not correctly seated, the shape and location of the restrictor member 12 must be determined so as to restrict the deploy direction and to reduce the shock applied to a person's head, during initial deployment of airbag 4.

The structure through which the restrictor member 12 and airbag door 9a mutually overlap provides the desired effect under a specific condition; that is, the restrictor member 12 moves with a lapping action against the airbag door 9a at the beginning of deployment, thus making it possible to guide the deployment of the airbag 4 in a transverse direction during the initial airbag deployment, and thereby reduce the chances of injuring the vehicle passenger's head.

The effectiveness of the restrictor member 12 is determined by its configuration and the design of the vehicle (e.g., how it may position a child's head). Therefore, it is desirable that the configuration of the restrictor member 12 is shaped in a way optimum effect will be obtained in relation to the vehicle.

Figure 7:
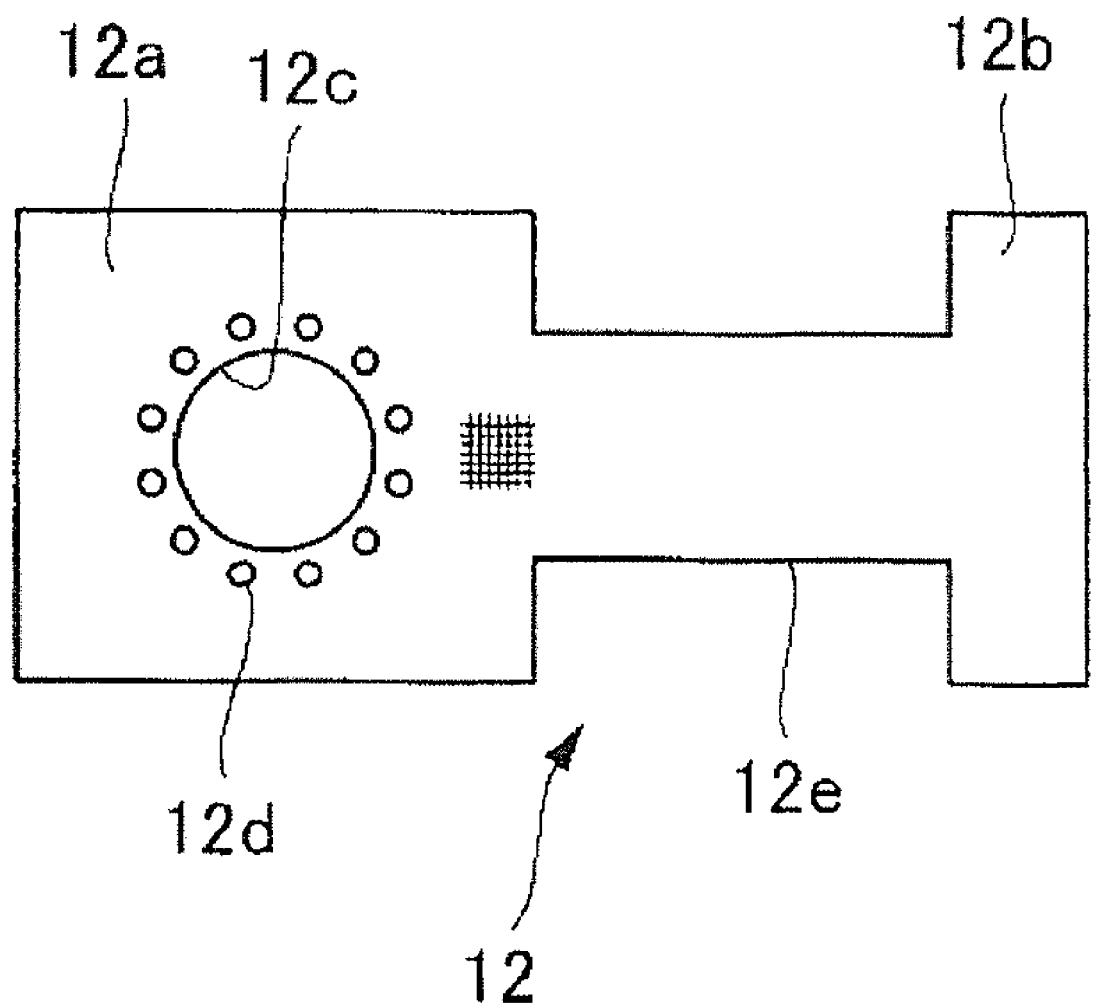
FIG. 7 is an overhead view of a modified embodiment of the restrictor member described in FIG. 2.

FIG. 7 describes a modified version of the restrictor member 12 shown in FIG. 2. The FIG. 7 shows that a linear cutout section, in the form of restriction limiter part 12e, may be formed in the restrictor member 12.

Figure 8:
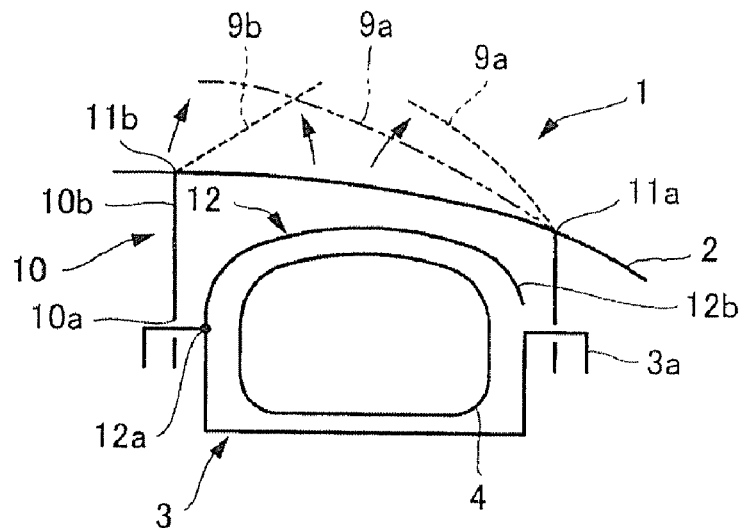
FIG. 8 is a cross sectional line drawing of the FIG. 1 airbag unit wherein the airbag door and the fixed end attachment location have been modified.

FIG. 8 illustrates a structure in which the fixed end 12a can be attached to the upper edge of the open part of the airbag housing 3, as long as the restrictor member 12 may wrap around the airbag 4, in a direction extending from the front to the rear of the airbag 4. Moreover, airbag doors 9a and 9b may be replaced with a single airbag door 9a mounted to hinge 11a whereby the single airbag door 9a opens in upward and rearward direction toward the passenger seat of the vehicle.

FIGS. 9 through 16 illustrate various examples of how the free end 12b of the restrictor member 12 can be structured to include a friction amplification part as means of increasing the friction generated against the airbag door 9a.

Figure 9:
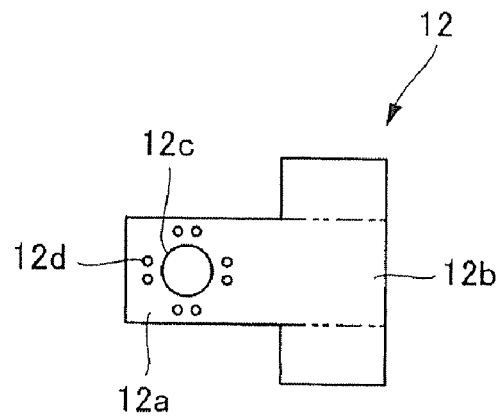
FIG. 9 is an overhead view of the FIG. 2 restrictor member incorporating the friction amplification part.
Figure 10:
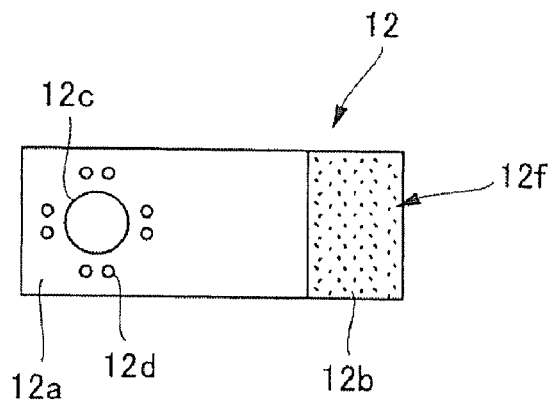
FIG. 10 is an overhead view of a modified version of the FIG. 9 restrictor member.

FIG. 9 illustrates a structure that increases the surface area of the free end 12b. FIG. 10 describes a structure in which the free end 12b is coated with a layer 12f of silicone or other substance capable of providing a desired frictional coefficient. It is also possible to apply this type of coating to the airbag door 9a to achieve the same effect.

Figure 11:
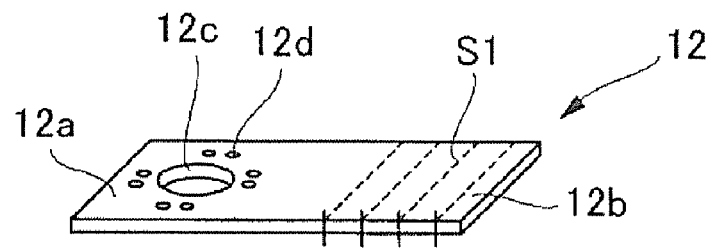
FIG. 11 is an oblique view of a modified version of the FIG. 9 restrictor member.
Figure 12:
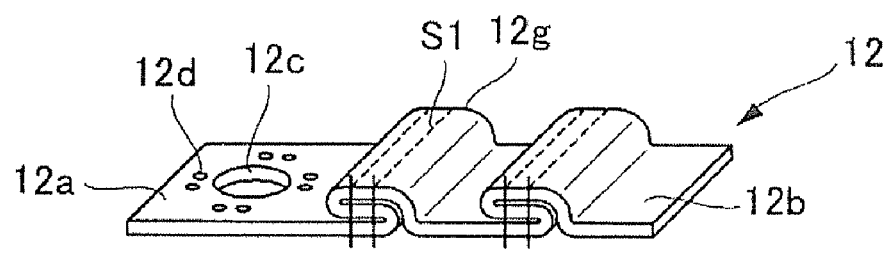
FIG. 12 is an oblique view of a modification of the FIG. 9 restrictor member.
Figure 13:
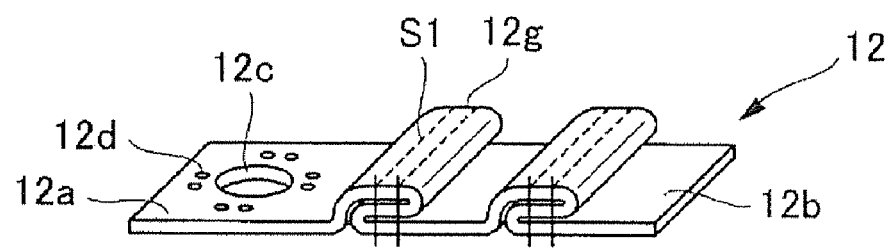
FIG. 13 is an oblique view of another modification of the FIG. 9 restrictor member.

FIG. 11 describes a structure in which the free end 12b incorporates lines of stitching 's1' as means of forming an uneven surface. FIGS. 12 and 13 describe the free end 12b that have been repeatedly folded in either direction and secured by the stitching 's1' to form a raised part 12g.

Figure 14:
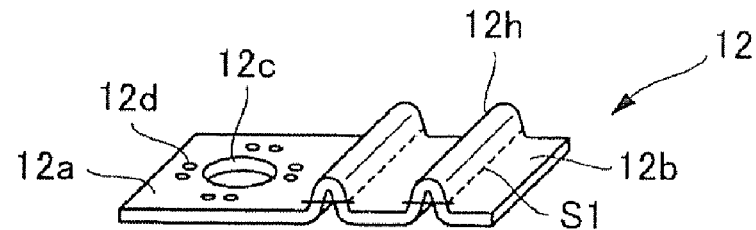
FIG. 14 is an oblique view of another modification of the FIG. 9 restrictor member.
Figure 15:
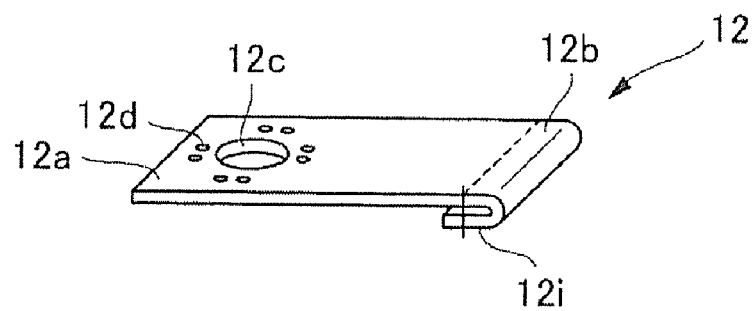
FIG. 15 is an oblique view of another modified version of the FIG. 9 restrictor member.
Figure 16:
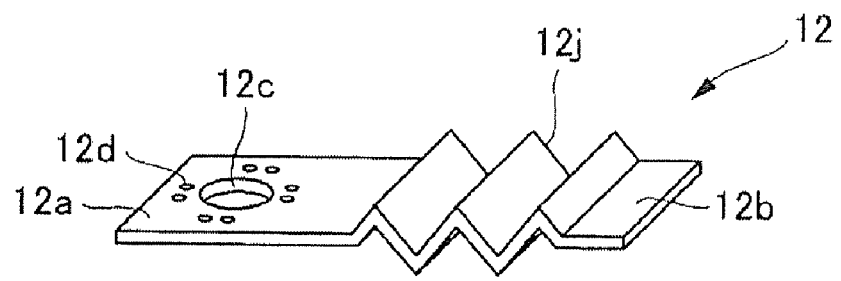
FIG. 16 is an oblique view of another modified version of the FIG. 9 restrictor member.

FIG. 14 describes how the free end 12b can be drawn together to form protruding wrinkle lines 12h that are secured by the stitching 's1'. FIG. 15 describes a structure in which the free end 12b can be thickened and strengthened by folding 12i under the end and securing it with the stitching 's1', thus reinforcing the region that contacts the airbag door 9a. FIG. 16 describes a structure in which an accordion fold 12j can be formed into the free end 12b through heat treating or other fabrication process or treatment.

Figure 17:
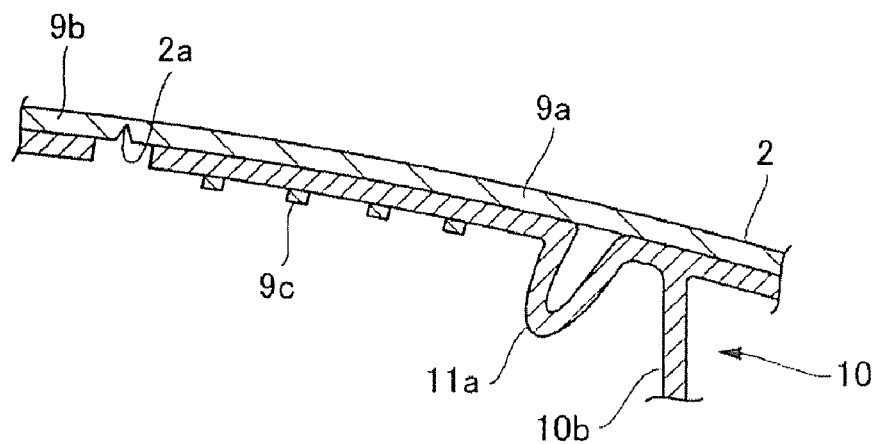
FIG. 17 is a cross sectional side view of another modified version of the FIG. 1 airbag door.

FIG. 17 describes how a friction augmentation part can be formed in the airbag door 9a against the free end 12b of the restrictor member 12 as means of increasing its frictional coefficient. The example shown in FIG. 17 incorporates nib elements 9c integrally formed to the surface of the airbag door 9a opposing the free end 12b.

To sum up, additional means may be provided to increase the frictional coefficient of the lapping action applied against the airbag door 9a by the free end 12b. As previously noted, this additional means may take the form of the stitching 's1' or the silicone or other like coating 12f that are able to generate friction against the airbag door 9a. Other friction augmentation means may also be employed such as an embossment on the underside (the part that comes into contact with restrictor means 12) of the airbag door 9a.

Figure 18:
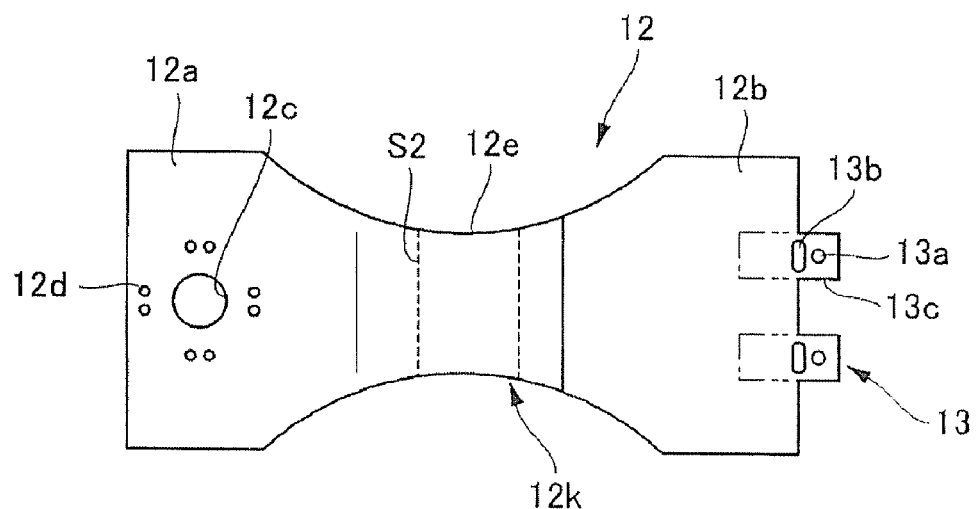
FIG. 18 is an overhead view of the FIG. 1 restrictor member when it is also used as a packing part.
Figure 19:
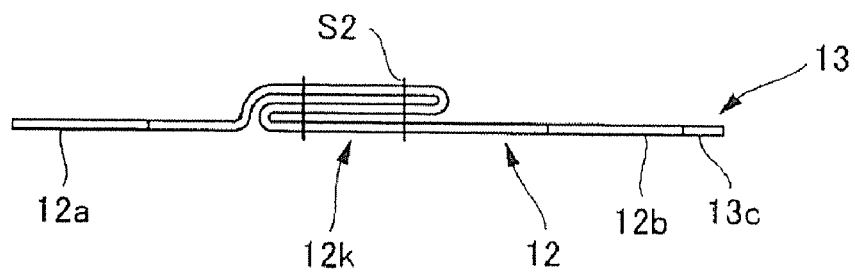
FIG. 19 is a side view of the FIG. 18 restrictor member.
Figure 20:
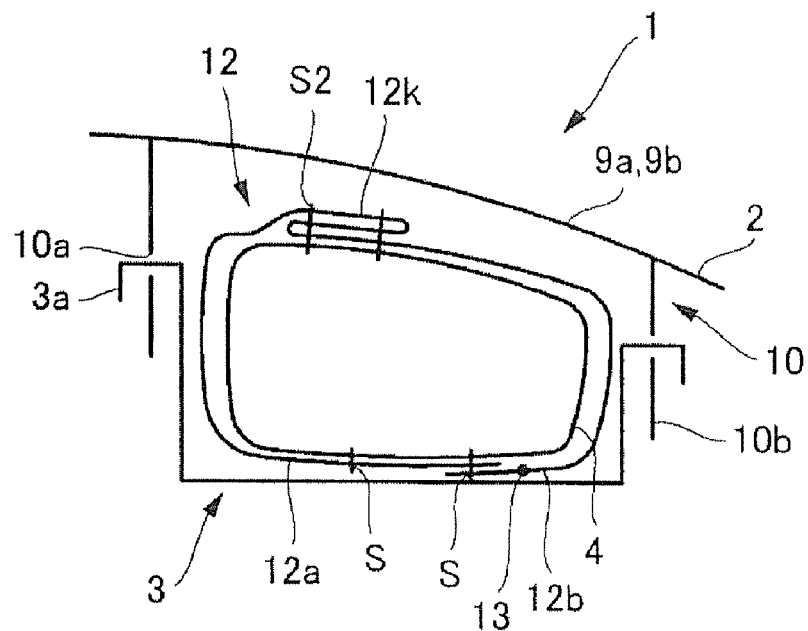
FIG. 20 is a cross sectional illustration of the airbag unit incorporating the FIG. 18 restrictor member.

FIGS. 18 through 20 describe a structure wherein the restrictor member 12 also serves as a packing part to maintain the airbag 4 in a folded condition within the airbag housing 3. The packing part is wrapped around the folded airbag 4 to maintain the airbag 4 in a folded condition from at a time of the insertion into the airbag housing 3 till it deploys.

In this embodiment, the restrictor member 12 is attached to the airbag housing 3 through a break-away part 13 attached to the free end 12b, the break-away part 13 being able to separate from the airbag housing 3 as a result of the pressure applied by the deploying airbag 4 to the restrictor member 12. The break-away part 13 includes an attachment orifice 13a and a connector tab 13c that is attached to the free end 12b though a tear-away slit 13b. The threaded stud 6 passes through the attachment orifice 13a to attach the free end 12b to the airbag housing 3.

In this embodiment, while the restrictor member 12 wraps around the airbag 4 with both free end 12b and fixed end 12a attached to the airbag housing 3, the free end 12b is attached through a mechanism that allows its release.

Part of the restrictor member 12 is drawn together into an overlapping part 12k that maintains the required length of the restrictor member 12 between the free end 12b and the fixed end 12a. Overlapping part 12k may be secured in a folded condition by releasable stitching 's2' or other like means.

The stitching 's2' holding the overlapping part 12k breaks when the airbag 4 begins to deploy, and the separation of the tear-away slit 13b is immediately followed. This mechanism provides the same effect as that previously described in regard to the friction generated at initial airbag deployment. The overlapping part 12k may be used or not depending on the effect desired.

Connector tab 13c may be formed as an integral member of the free end 12b of the restrictor member 12, or may be structured as a separately attached part as shown by the broken lines in FIG. 18.

Compared to a structure in which the packing part is separately attached, combining the packing part with the restrictor member 12 itself makes it easier to provide the packing part with the automotive airbag unit 1. Moreover, the airbag unit assembly process is improved, and the overall manufacturing process is simplified.

Figure 21:
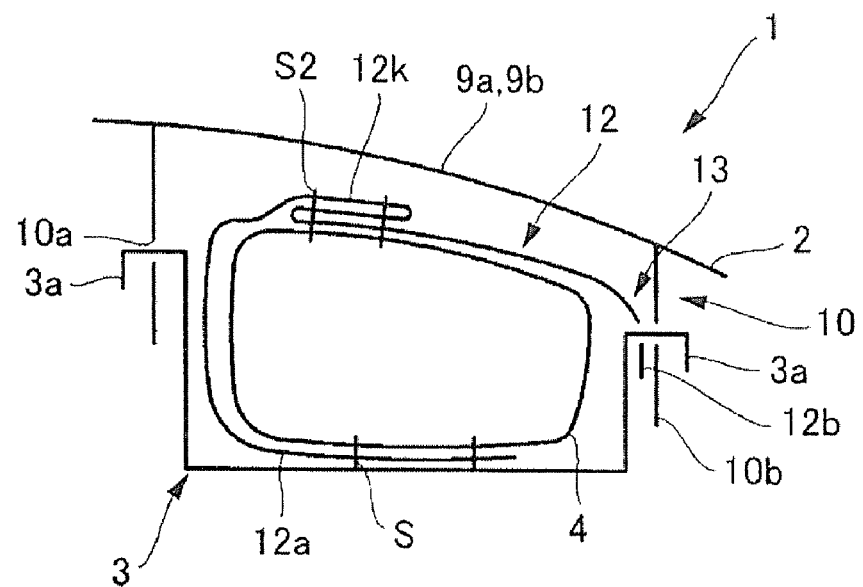
FIG. 21 is a cross sectional illustration of a modification of the FIG. 1 restrictor member when it is also used as a packing part.
Figure 22:
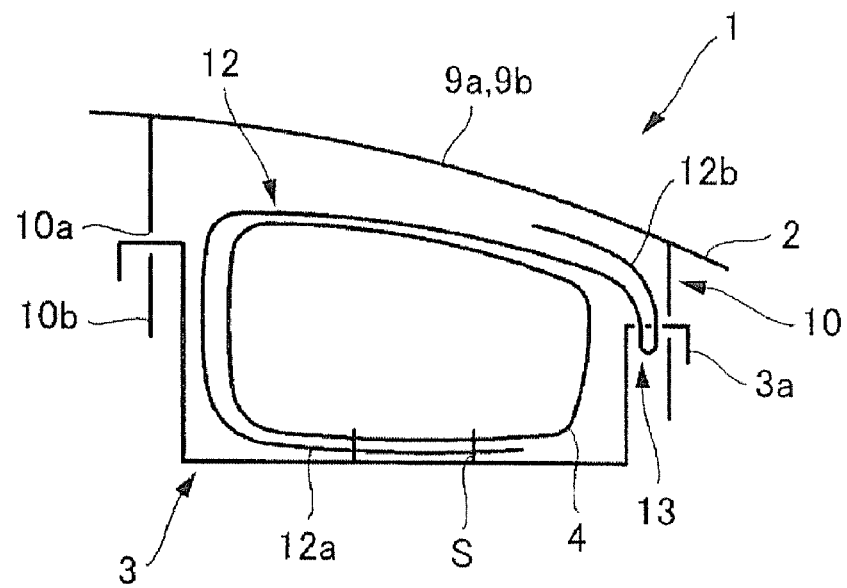
FIG. 22 is a cross section illustration of another modification of the FIG. 1 restrictor member when it is also used as a packing part.

FIG. 21 describes a structure in which the attachment orifice 13a of the connector tab 13c is attached through its placement over the hangar piece 3a on the airbag housing 3. FIG. 22 describes a structure in which the free end 12b also operates as the break-away part 13. In this structure, two engaging slits are formed in the hangar piece 3a, and the break-away part 13 is formed by the free end 12b of the restrictor member 12 being progressively inserted through both engaging slits. In addition to this structure, the restrictor member 12 may also incorporate the previously described packing part.

Figure 23:
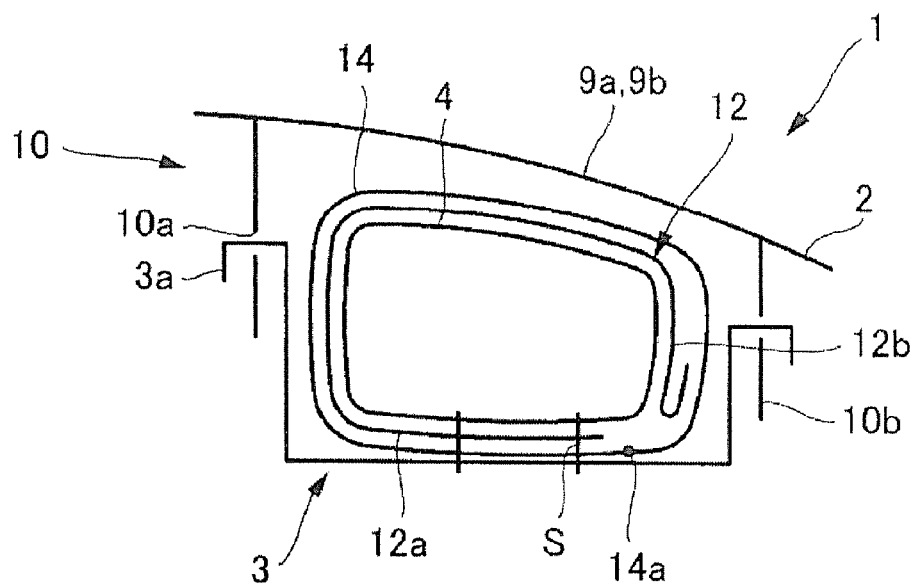
FIG. 23 is a cross sectional illustration of the FIG. 1 airbag unit when it uses a separate packing part.
Figure 24:
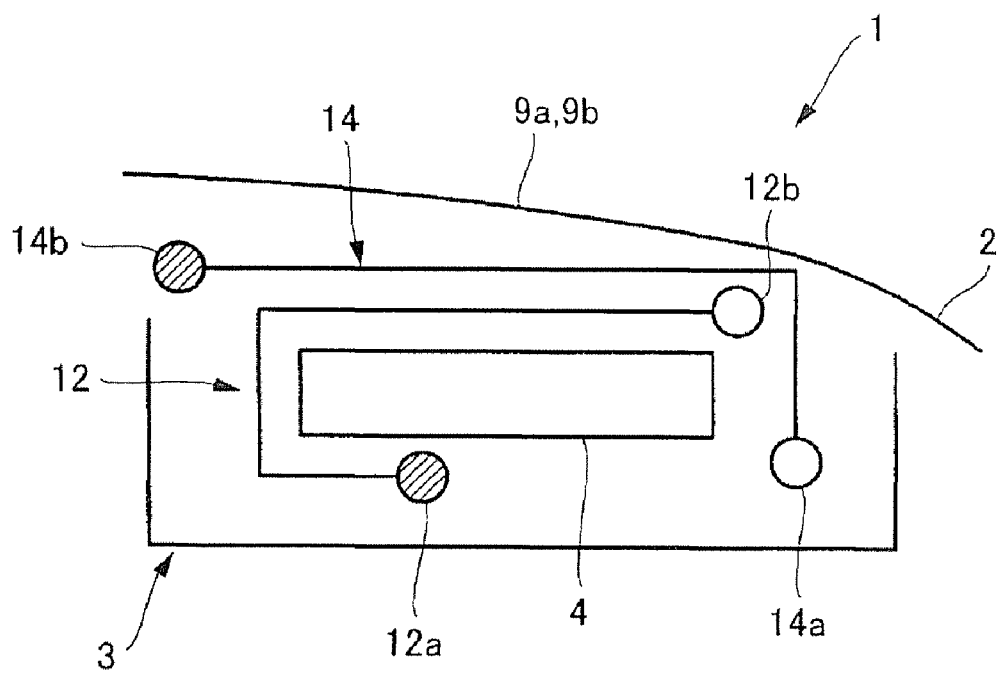
FIG. 24 is an illustrative drawing of the airbag unit invention describing the tear-away part and fixed attachment location of the FIG. 23 packing part, and their relationship to the fixed end and free end of the restrictor member.

FIGS. 23 and 24 describe a structure in which a packing part 14 overlaps the restrictor member 12 to maintain the folded condition of the airbag 4 within the airbag housing 3, and in which the packing part 14 is attached to the airbag housing 3 through a tear-away part 14a that is able to separate as a result of the pressure applied by the deploying airbag 4.

The packing part 14 and restrictor member 12 are connected by stitching 's', or other like means, and thus form a single structure. Both the packing part 14 and the restrictor member 12 are attached to the airbag housing 3. As shown in FIG. 23, the packing part 14 passes over the restrictor member 12, continues to encompass the entire airbag 4, and is attached to the airbag housing 3 through a tear-away part 14a, such as a slit or the like.

As shown in FIG. 24, the tear-away part 14a is located at the rear of the airbag housing 3, in respect to the fixed end 12a and free end 12b (in relation to the fore-aft axis of the vehicle) of the restrictor member 12. Therefore, the packing part 14 is fixedly attached at anchor point 14b at the front of the airbag housing 3 in respect to the fore-aft axis of the vehicle.

If the tear-away part 14a were attached at the front part of the airbag housing 3, with its anchor point 14b secured at the rear, the placement of the packing part 14 between the airbag door 9a and the restrictor member 12 would prevent the free end 12b of the restrictor member 12 from generating sufficient friction against the airbag door 9a.

Securing the tear-away part 14a at the rear of the airbag housing 3 allows the packing part 14 to quickly vacate the region between the airbag door 9a and the restrictor member 12 as it is pulled toward the front of the vehicle by the initially deploying airbag 4, thus allowing sufficient friction to be generated by the free end 12b against the airbag door 9a as it swings open toward the rear of the vehicle.

This structure maintains the effective functioning of the restrictor member 12 even with the use of a separately installed packing part 14. Forming the packing part 14 as an integral part of the restrictor member 12, however, prevents the use of the restrictor member 12 from complicating the installation of the packing part 14.

Figure 25:
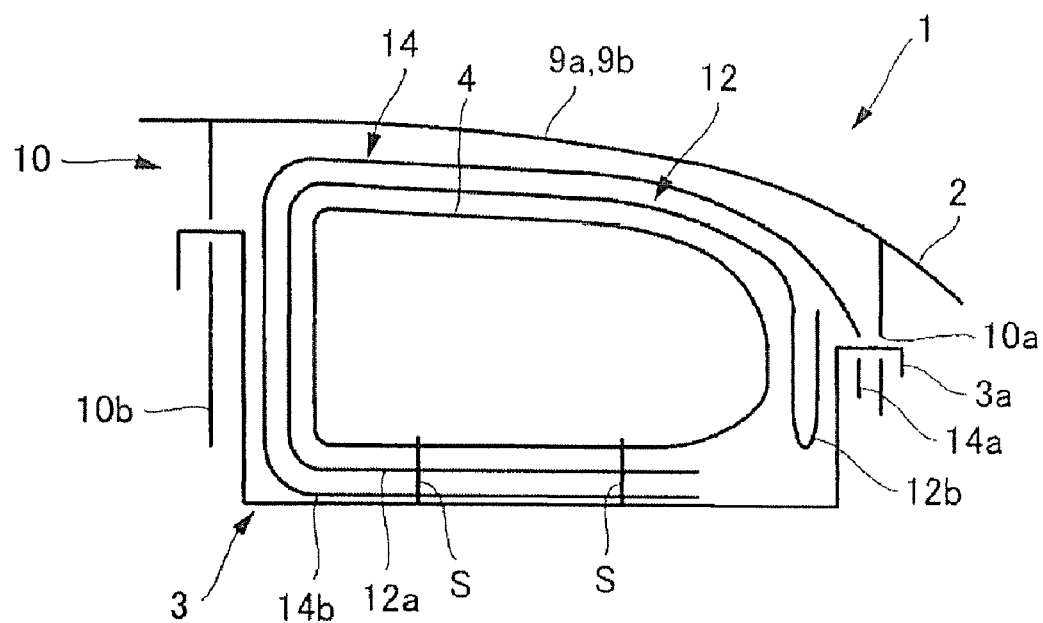
FIG. 25 is a cross sectional illustration of the FIG. 1 airbag unit incorporating another modification of the separate packing part.
Figure 26:
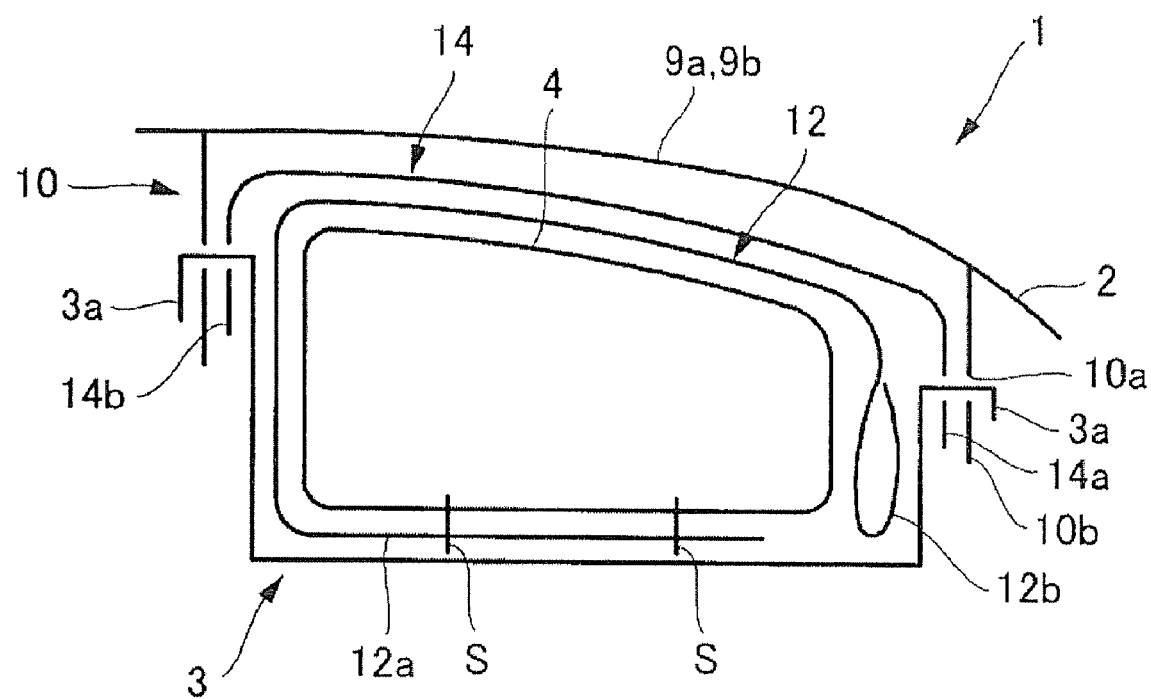
FIG. 26 is a cross sectional illustration of the FIG. 1 airbag unit incorporating another modification of the separate packing part.

FIG. 25 describes a structure in which the tear-away part 14a of the packing part 14 is formed as an engaging hole and hangs on the hanger piece 3a of the airbag housing 3. FIG. 26 describes a structure that includes, in addition to the structure shown in FIG. 25, the anchor point 14b of the packing part 14 having a hole to be engaged with the hanger piece 3a located at the front part of the airbag housing 3, so as to attach the packing part 14 to the hanger piece 3a.

It is noted that all of the previously described embodiments provide the same operational effects as the embodiment described in FIGS. 1 through 6.

It is also noted that the foregoing examples have been provided merely for the purpose of explanation and are in no way to be construed as limiting of the present invention. While the invention has been described with reference to specific embodiments, it is understood that the descriptions herein are for illustrative purposes only, and do not infer any limitations as to the structure of the invention. Changes may be made, within the purview of the appended claims, without departing from the scope and spirit of the invention in. Although the invention has been described with reference to particular structures, its novelty extends to all functionally equivalent structures, methods and uses within the scope of the appended claims.

What is claimed is:

1. An automotive airbag apparatus comprising:
   an airbag folded within an airbag housing and deployed by gas injected therein from an inflator;
   an airbag door attached to the airbag housing through a hinge with rotationally movable state and opened by pressure applied from deploying force of the airbag; and
   a restrictor member wrapped over the folded airbag in a direction from front to rear of the vehicle, the restrictor member having a forwardly located fixed end attached to the airbag housing and a rearwardly located free end, the free end making frictional contact against the airbag door in a region proximate the hinge when the airbag door opens by the pressure applied thereto at a start of the airbag deployment;
   wherein the door swings in a direction toward a passenger upon deployment of the airbag.

2. The automotive airbag apparatus according to claim 1, wherein the width of the restrictor member is established to a dimension narrower than that of the airbag door in the width direction of the vehicle.

3. The automotive airbag apparatus according to claim 1, wherein the fixed end and free end of the restrictor member are set locations where the restrictor member covers both one point being the forward lower part of the folded airbag and another point being the rearward upper part of the airbag.

4. The automotive airbag apparatus according to claim 1, wherein the free end of the restrictor member is attached to the airbag housing through a break-away part capable of releasing the free end from pressure applied thereto by the deploying airbag.

5. The automotive airbag apparatus according to claim 1, wherein the restrictor member is also utilized as a packing part to maintain the folded condition of the airbag within the airbag housing.

6. The automotive airbag apparatus according to claim 5, wherein the packing part that maintains the airbag in a folded condition within the airbag housing overlaps the restrictor member and is attached to the airbag housing through a tear-away part able to release from the airbag housing in response to the pressure applied by the airbag deployment.

7. The automotive airbag apparatus according to claim 6, wherein the tear-away part is attached to an internal rearward portion of the airbag housing relative to the fore-aft axis of the vehicle.

8. The automotive airbag apparatus according to claim 1, wherein the door is adapted to engage a head portion of an out of position passenger and create a friction force between the door and the restrictor member during initial deployment of the airbag.

9. The automotive airbag apparatus according to claim 1, wherein prior to deployment of the airbag, the restrictor member extends across the top of the airbag in a first direction and the cover extends across the top of the airbag from the hinge in a second, opposite direction.

10. The automotive airbag apparatus according to claim 1, further comprising a friction amplification part provided on one of the free end of the restrictor member and the airbag door for amplifying friction generated against the other of the free end of the restrictor member and the airbag door.

11. The automotive airbag apparatus according to claim 10, wherein the friction amplification part is provided at the free end of the restrictor member as means for amplifying friction generated against the airbag door.

12. The automotive airbag apparatus according to claim 10, wherein the friction amplification part is provided on the airbag door for amplifying friction against the free end of the restrictor member.

13. An automotive airbag apparatus comprising:
    an airbag folded within an airbag housing and deployed by gas injected therein from an inflator;
    an airbag door attached to the airbag housing through a hinge with rotationally movable state and opened by pressure applied from deploying force of the airbag;
    a restrictor member wrapped over the folded airbag in a direction from front to rear of the vehicle, the restrictor member having a forwardly located fixed end attached to the airbag housing and a rearwardly located free end, the free end making frictional contact against the airbag door in a region proximate the hinge when the airbag door opens by the pressure applied thereto at a start of the airbag deployment; and
    a friction amplification part provided on one of the free end of the restrictor member and the airbag door for amplifying friction generated against the other of the free end of the restrictor member and the airbag door.

14. The automotive airbag apparatus according to claim 13, wherein the friction amplification part is provided at the free end of the restrictor member as means for amplifying friction generated against the airbag door.

15. The automotive airbag apparatus according to claim 13, wherein the friction amplification part is provided on the airbag door for amplifying friction against the free end of the restrictor member.

16. An automotive airbag apparatus installed within a vehicle instrument panel behind an airbag door, the airbag door mounted for rotation about a hinge, the apparatus having a restrictor member located behind the airbag door, the restrictor member having a fixed end at the vehicle forward side of the restrictor member and a releasable fixed end or free end at the vehicle rearward side of the restrictor member, the restrictor member wrapping around the airbag from the front side to the rear side of the airbag, and the rearward part of the restrictor member overlapping the airbag door so as to restrict and control the deployment direction in early phase of airbag deployment through frictional contact between the free end of the restrictor member and a region of the airbag door proximate the hinge;
    wherein the door swings in a direction toward a passenger upon deployment of the airbag.

17. The automotive airbag apparatus according to claim 16, wherein the restrictor member is of a strap or sash-like configuration as oriented with a direction from front to rear of the vehicle.

18. The automotive airbag apparatus according to claim 16, wherein prior to deployment of the airbag, the restrictor member extends across the top of the airbag in a first direction and the cover extends across the top of the airbag from the hinge in a second, opposite direction.

19. The automotive airbag apparatus according to claim 16, further comprising a friction amplification part provided on one of the free end of the restrictor member and the airbag door for amplifying friction generated against the other of the free end of the restrictor member and the airbag door.

* * * * *